United States Patent [19]
Gilbrech

[11] Patent Number: 5,392,399
[45] Date of Patent: Feb. 21, 1995

[54] BRIDGE SYSTEM FOR SELECTIVELY ROUTING FRAME WITH ORDERING PARAMETER IDENTIFYING ORDERING OF IDENTIFIERS ONLY BASED UPON ITS SOURCE IDENTIFIER

[75] Inventor: Sidney A. Gilbrech, Los Altos, Calif.

[73] Assignee: 3Com Corporation, Santa Clara, Calif.

[21] Appl. No.: 884,785

[22] Filed: May 18, 1992

[51] Int. Cl.⁶ .................................. G06F 13/00
[52] U.S. Cl. .................... 395/200; 364/242.94; 364/284.3; 364/284.4; 364/DIG. 1; 370/85.13; 370/94.1
[58] Field of Search ............ 395/200; 370/85.13, 370/85.14, 85.15, 94.1, 94.3, 60.1, 92; 364/284, 284.3, 284.4, 242.94

[56] References Cited

U.S. PATENT DOCUMENTS

| | | | |
|---|---|---|---|
| 4,287,592 | 9/1981 | Panlish et al. | 370/92 |
| 5,018,137 | 5/1991 | Backes et al. | 370/85.13 |
| 5,060,228 | 10/1991 | Tsutsui et al. | 370/85.13 |
| 5,088,032 | 2/1992 | Bosack | 395/200 |
| 5,088,090 | 2/1992 | Yacoby | 370/85.13 |
| 5,113,495 | 5/1992 | Uehara | 395/200 |
| 5,151,897 | 9/1992 | Suzuki | 370/85.13 |
| 5,210,748 | 5/1993 | Onishi et al. | 370/85.13 |
| 5,251,213 | 10/1993 | Videlock et al. | 370/85.13 |
| 5,327,431 | 7/1994 | Heske, III et al. | 370/85.13 |

OTHER PUBLICATIONS

TMS380 Second–Generation Token Ring, User's Guide, 1990, Texas Instruments, pp. 1–5 to 1–18, 2–16 to 2–27, 3–35 to 3–37 & throughout.

*Primary Examiner*—Thomas C. Lee
*Assistant Examiner*—Moustafa M. Meky
*Attorney, Agent, or Firm*—Haynes & Davis

[57] ABSTRACT

An N-way bridging system for local area networks (LANs) through which a source routed frames are transmitted, is based on hardware filtering in bridge ports responsive to the input LAN and bridge identified in the source routed frame, independent of the output LAN identified in the source routed frame. This filtering forwards the frame to the bridge host processor if a match on the input LAN and bridge number is detected. The host then reads the output LAN parameter from the frame and determines the appropriate routing. This technique preserves the hardware filtering of the IBM Source Routing specification for token ring LANs at least in part, and is assisted by the bridge host processor in determining the output port on the bridge.

9 Claims, 4 Drawing Sheets

BRIDGE SYSTEM FOR SELECTIVELY ROUTING FRAME WITH ORDERING PARAMETER IDENTIFYING ORDERING OF IDENTIFIERS ONLY BASED UPON ITS SOURCE IDENTIFIER

BACKGROUND OF THE INVENTION

1. Field of the Invention

The present invention relates to methods and apparatus for transferring frames of data from a first local area network through a bridge to a second local area network; and more particularly to N-way bridges for internetworking among source routing networks, such as token rings.

2. Description of Related Art

The token ring access method specified by the ANSI/IEEE Standard 802.5 has gained widespread application in the industry. One common technique for interconnecting such token ring networks is known as the IBM Source Routing specification (*Token Ring Network Architecture Reference*, 3rd Ed., IBM Corp., 1989, (SC 30-3374-02), pp. 2-6 to 2-11).

The IBM Source Routing specification has been designed for two-way token ring internetworking bridges. The internetworking industry, however, has grown to require bridges capable of interconnecting more than just two token ring networks. This technique is known as N-way bridging. Because of the original limitation to two-way source routing bridges, vendors have come up with a number of work around schemes to perform N-way bridging. Vendors of which Applicant is aware to date use a scheme requiring a "virtual ring" node within the bridge to work around the limitation to two-way bridging in the Source Routing specification. The use of a virtual ring node has a number of disadvantages that arise out of the limitations of source routing in token ring networks.

The manner in which source routing information is formatted in standard frames leads to at least one limitation. The IBM Source Routing format uses three basic fields within a source routed frame to perform the bridging function. These fields are often referred to as ring in, bridge number, and ring out. The ring in parameter includes the ring number of the input LAN, the bridge number includes an identifier for the bridge, and the ring out parameter includes the ring number of the output LAN. The bridge source routing hardware looks at the ring in, bridge number, and ring out parameters to determine whether the frame matches the input ring, output ring, and bridge number of the local two-way configuration. If the values match, then the frame is copied up to software in the bridge host processor for retransmission. If the fields do not match, then the frame is not copied.

Source routing is based on the development of a routing information field which includes one or more ring in, bridge number, ring out sets which are configured into a plurality of segment number fields in the source routed frame format. In the source routing segment, the segment number fields are 16 bits wide and contain a ring number and a bridge number. These segment number fields can be concatenated up to eight times according to one standard to provide an internetworking route with a maximum of eight hops from one local area network through a bridge to another local area network. There are ways to extend this hop count limit at the expense of additional complexity of source routed frames.

Using the virtual ring technique consumes one of the available hops. This occurs because in order to send a frame through an N-way bridge using the virtual ring technique, the source of the frame must include a segment number for the virtual ring on the bridge. Thus, to route a frame through a bridge, the frame must store the ring in identifier of the input ring, the bridge number of the bridge, the ring out identifier of the virtual ring, the bridge number of the bridge, and the ring out identifier of the actual output LAN. As can be seen, this technique consumes three segment numbers for a single hop. Thus, in an internetworking configuration, which includes a number of virtual ring type N-way bridges, the physical hop count that can be accomplished in a source routed frame is substantially reduced. Also, for very large internetworking configurations in which the maximum number of local area networks is being approached, the virtual ring type N-way bridge is undesirable because it consumes a local area network number for the virtual ring identifier.

It is desirable to provide for N-way bridging in token ring networks in which source routed frames are transmitted without suffering the penalty of the virtual ring technique, while maintaining hardware filtering available for the IBM Source Routing specification.

SUMMARY OF THE INVENTION

The present invention provides a bridge system for N-way bridging between local area networks (LANs) through which source routed frames are transmitted, and which is based on hardware filtering in bridge ports responsive to the input LAN and bridge identified in the source routed frame, independent of the output LAN identified in the source routed frame. This filtering forwards the frame to the bridge host processor if a match on the input LAN and bridge number is detected. The host then reads the output LAN parameter from the frame and determines the appropriate routing. This technique preserves the hardware filtering of the IBM Source Routing specification at least in part, and is assisted by the bridge host processor in determining the output port on the bridge. Further, it does not consume a hop count in the source routing frame because there is no virtual ring involved.

Thus, according to one aspect, the present invention can be characterized as a bridge, which includes a bridge host processor and a plurality of bridge ports. At least one bridge port in the bridge includes source routing hardware assist logic which applies a match signal when the source routed frame identifies a matching bridge and matching input LAN. The port also includes a network interface processor which performs media access processing for the bridge port, and is responsive to the match signal to forward the source routed frame to the bridge host processor.

The bridge host processor includes software for determining the output LAN identifier in a source routed frame forwarded from the bridge port. Using the output LAN identifier, the frame may be routed to the appropriate bridge port.

In bridges according to the present invention for internetworking between token ring LANs supporting the IBM Source Routing specification, the format of the frame includes an ordering parameter which identifies an order within the source routed frame for the input LAN identifier, bridge identifier, and output LAN identifier. In these systems, the source routing hardware assist logic includes memory storing a bridge identifier and LAN identifier for the bridge port. Also, a memory for sampling the ordering parameter, the input LAN identifier, and the bridge identifier in received frames is provided in the hardware assist logic. The stored identifiers and the sampled identifiers are compared in logic which is responsive to the ordering parameter for identifying the location of the appropriate parameters in the frame, to generate the match signal.

In another aspect, the present invention provides a bridge port for use with a bridge which is operable in a first mode for two-way bridging in which the source routing filter performs a hardware comparison on both the input and output LAN identifier according to the standard two-way bridging technique, and which is operable in a second mode for N-way bridging in which the source routing filtering is performed independent of the output LAN identifier.

Furthermore, the present invention can be characterized as a method for transferring source routed frames of data from an input LAN to any one of a plurality of output LANs, which comprises the steps of:

storing a port LAN identifier and a bridge identifier in a bridge port coupled to the input LAN;

sampling the input LAN identifier and bridge identifier in a frame received by the input bridge port;

comparing the sampled input LAN identifier and bridged identifier to the stored port LAN identifier and bridge identifier;

forwarding the received frame to a bridge host processor if a match is found in the comparing step;

reading the output LAN identifier from the received frame in the bridge host processor; and if the output LAN identifier identifies one of the plurality of output LANs, then forwarding the frame to identified output LAN.

Other aspects and advantages of the present invention can be seen upon review of the figures, the detailed description, and the claims which follow.

DESCRIPTION OF THE PREFERRED EMBODIMENTS

Figure 1:
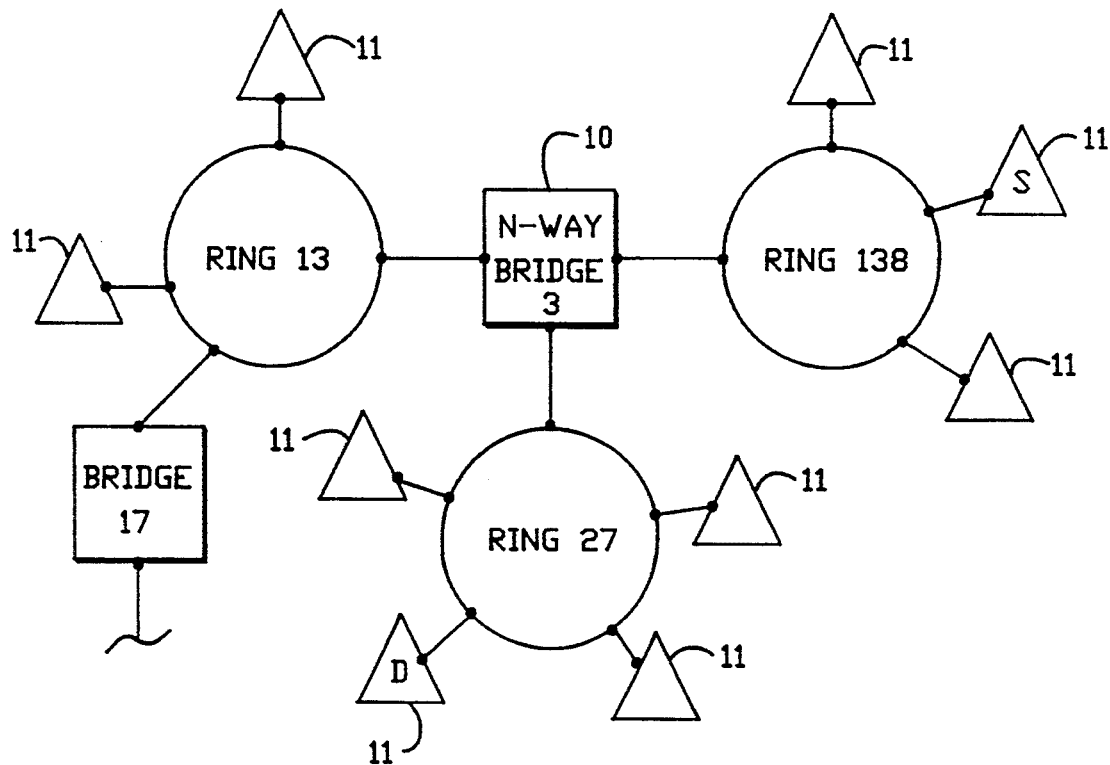
FIG. 1 is a schematic diagram of an N-way bridge interconnecting a plurality of token ring networks.
Figure 2:
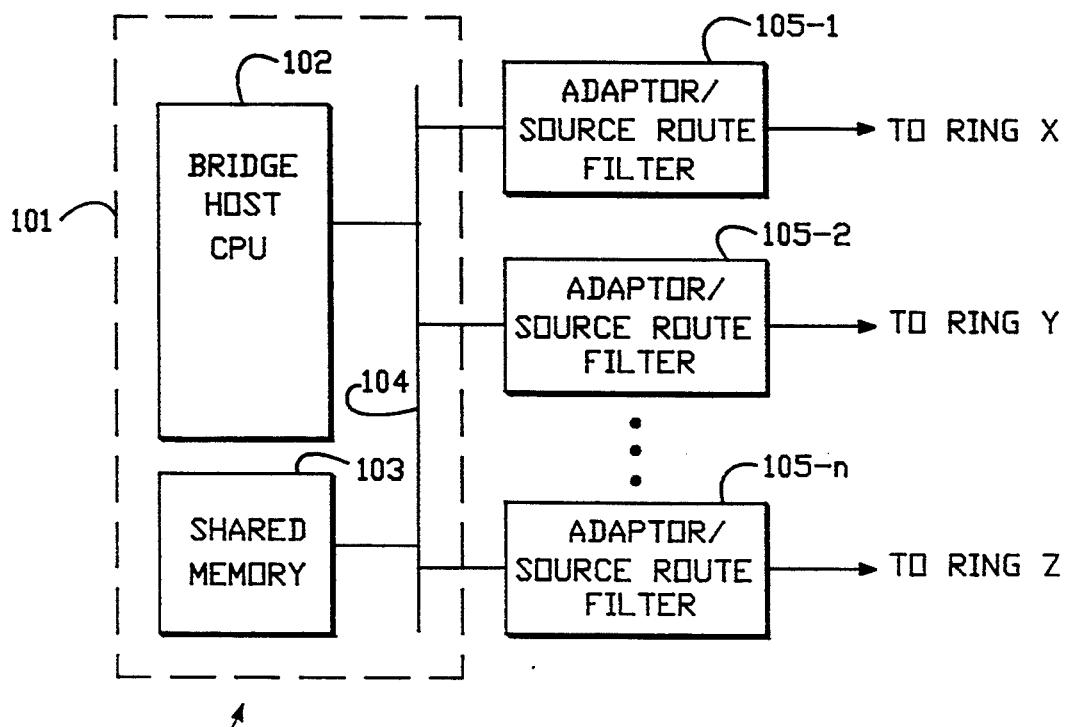
FIG. 2 is a schematic block diagram of an N-way bridge according to the present invention.
Figure 3:
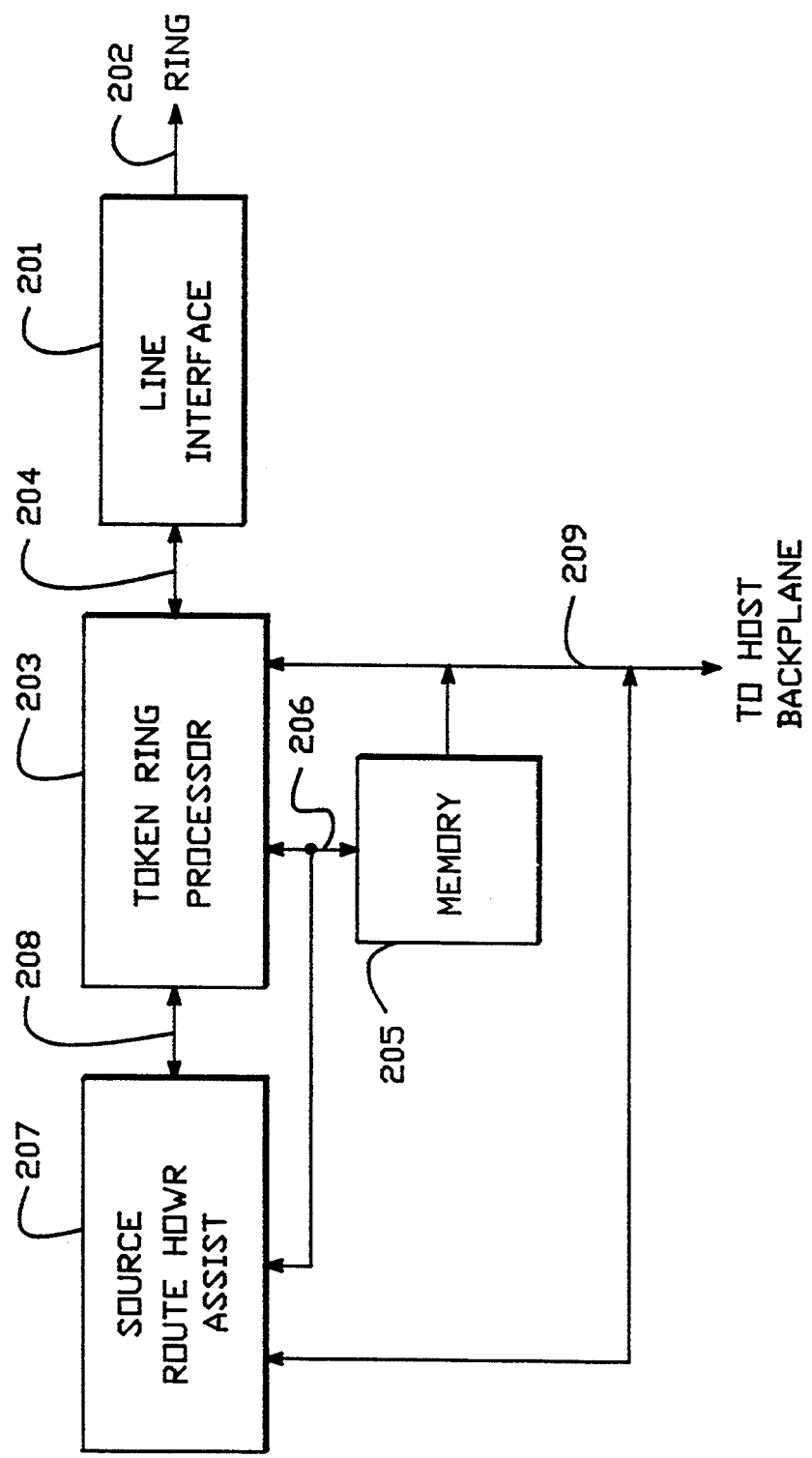
FIG. 3 is a schematic block diagram of a bridge port for use in a bridge such as shown in FIG. 2.
Figure 4:
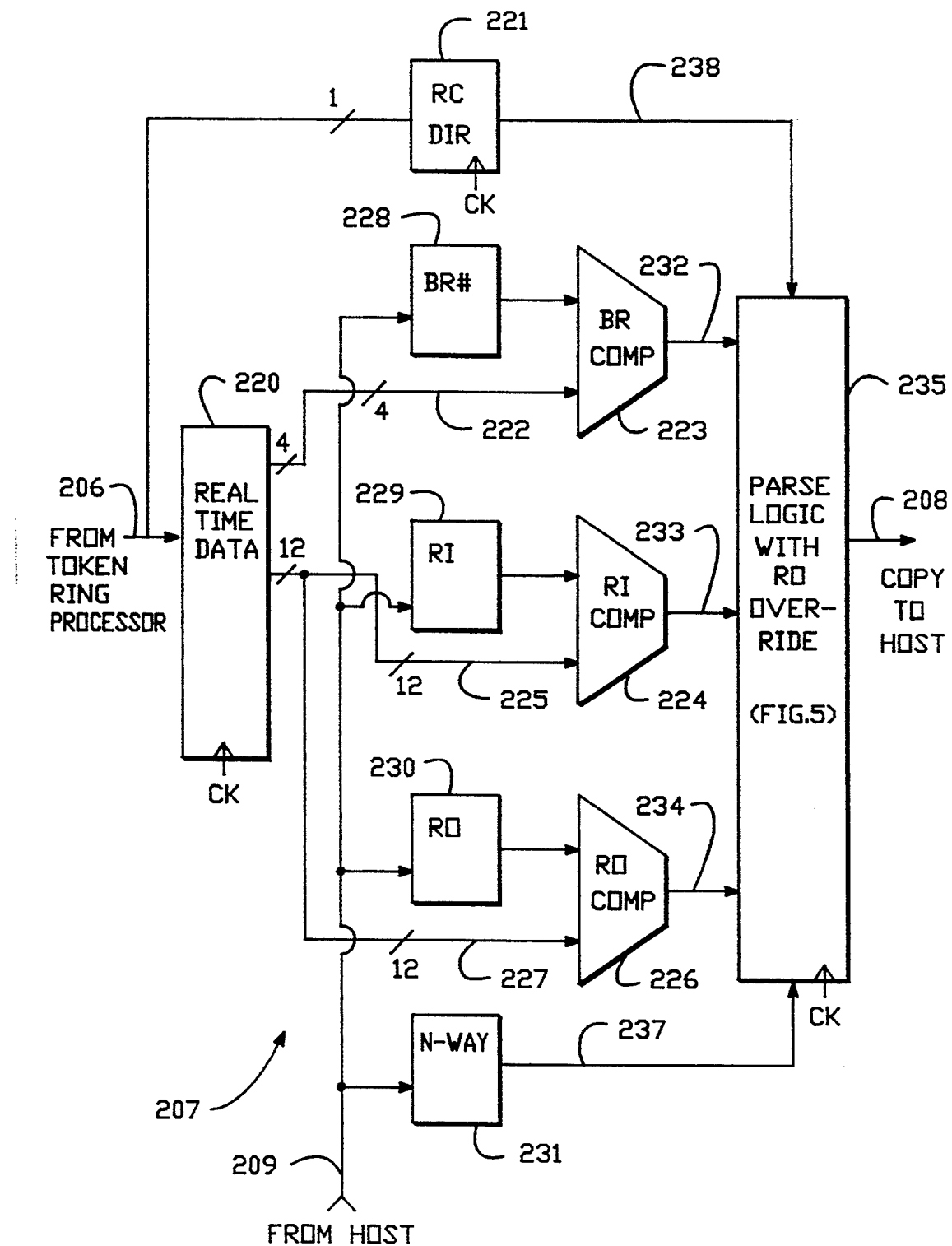
FIG. 4 is a functional block diagram of a source routing filter for use in a bridge port such as that shown in FIG. 3.
Figure 5:
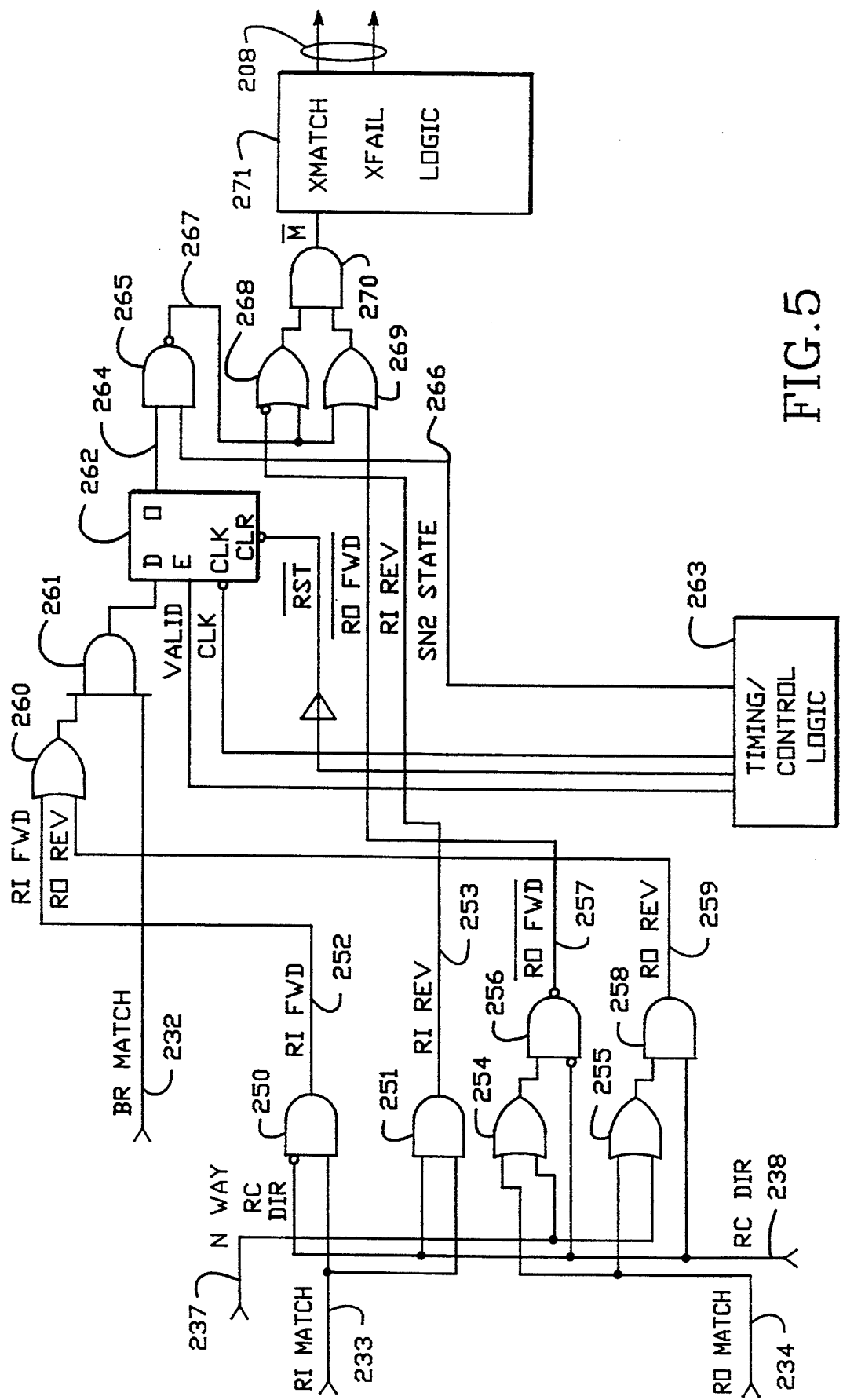
FIG. 5 is a logic diagram of parsing logic with ring out override for use in source routing filters such as that shown in FIG. 4.

A detailed description of preferred embodiments of the present invention is provided with respect to the figures. FIG. 1 provides an overview of an internetworking configuration for token ring systems. FIG. 2 illustrates the architecture of an N-way bridge according to the present invention. FIGS. 3–5 provide a description of bridge ports implementing the source routing filter of the present invention.

As shown in FIG. 1, an N-way bridge 10 may be configured to interconnect a plurality of local area networks. In FIG. 1, the N-way bridge 10 is configured for internetworking among three token ring networks, ring 13, ring 138, and ring 27. Each ring includes one or more terminals which generate source routed frames for transmission through the bridge 10 to other rings. Of course, the bridge may be connected to other types of LANs as well, such as CSMA/CD networks or token bus networks as known in the art.

The terminals are schematically represented by triangles, all having reference number 11. Of course, the terminals 11 may take on a variety of configurations, ranging from main frame computers to personal computers, to intermediate systems such as routers, all of which are referred to as a terminal 11 for convenience in the present application. Each of the terminals 11 has a unique address on the network which is appended in a transmitted frame as the source address or the destination address, as the case may be for a given frame.

In addition, each of the rings has a unique ring number which, according to the IBM Source Routing specification, is limited to numbers between 1 and 4,096. Generally, each bridge 10 in the network has a unique bridge number. Thus, the bridge 10 shown in FIG. 1 is given bridge number 3. There may be other bridges coupled to the rings, such as bridge 17, to provide for a wide ranging internetworking configuration.

According to the IBM Source Routing specification, when a terminal desires to communicate with a terminal in another ring, it sends an explorer frame out on the ring. The explorer frame is picked up by the bridge 10 which determines from tables on the bridge on which ring the destination terminal resides. The explorer frame is then forwarded across the ring which leads to the destination terminal. Along the way, routing information is stored in the frame in a specified order. When the destination terminal receives the explorer frame, it sends back an acknowledgement which follows the route specified by the routing information in the frame. This routing information is not reordered for transmission of the response in the opposite direction. Rather, an ordering parameter is set in the frame to specify the position of the input ring, bridge number, and output ring in the routing information field. Once the originating terminal receives the response, it stores the routing information for communication with the specified terminal and inserts that information in any frame of data destined to the same end point.

Source routed frames in the IBM Source Routing specification have a prespecified standard format. The standard format involves a number of beginning fields, such as the starting delimiter and the like, followed by a 6 byte destination address, a 6 byte source address, and an optional routing information field. If the highest order bit of the source address referred to as the routing information indicator RII, is set to 1, then the routing information field will be loaded with source routing information. The routing information field format includes a first 2 byte segment (16 bits) called a routing control field which includes, among other parameters, an ordering bit called the direction bit. Following the routing control field are a plurality of ring number/bridge number pairs called segment numbers.

The ring number and bridge number in a first segment number, and the ring number in the immediately following segment number specify a hop from one local area network across a bridge to another local area network. The direction bit specifies the order in which the input ring number (ring in) and output ring number (ring out) occur relative to the bridge number for the hop. In a first state, the ring in number occurs first, followed by the bridge number, followed by the ring out number. In a second state of the direction bit, the ring out number occurs first, followed by the bridge number and the ring in number. The use of the direction bit allows a destination device to send a response without reordering the routing information that it received from the source. Rather, it merely sets the direction bit so that the routing information now specifies the return trip along the same path in an opposite direction.

Thus, if a terminal, such as terminal S in ring 38, were to send a message to a terminal, such as terminal D in ring 27, the routing information field would include a ring in number 138, a bridge number 3, and a ring out number 27. For a response, terminal D in ring 127 would set the direction bit in the routing information field so that, without reordering the information, the ring in parameter becomes 27, the bridge remains 3, and the ring out parameter becomes 138. The source terminal S and the destination terminal D are uniquely identified by their source and destination addresses. However, the N-way bridge 10 need not process the source and destination devices in order to route the frame. Rather, it may rely merely on the routing information field.

Additional hops across networks are specified in the routing information field by appending a series of segment numbers, up to the maximum of 8 or 16 segment numbers in current industry standards. Thus, to route a frame from ring 138 to a destination on the other side of bridge 17, the routing information field would include ring in 138, bridge 3, ring out 13, bridge 17, and the ring out parameter of the next bridge in the path.

FIG. 2 illustrates the basic architecture of an N-way bridge 100 according to the present invention. The N-way bridge includes a bridge host processor 101 which includes a bridge host CPU 102, a shared memory 103, and a backplane bus 104 interconnecting the shared memory 103 and the bridge host CPU 102. Coupled with the bridge host processor 101 are a plurality of bridge ports 105-1, 105-2, . . . 105-N. Each of the bridge ports 105-1, 105-2, . . . 105-N is coupled to a respective local area network, such as ring X, ring Y, ring Z, respectively. Not all ports need to be coupled to the same type of local area network. Thus, the bridge ports may be specially adapted to the particular type of LAN to which it is connected, and the bridge host processor 101 may provide a number of services unique to bridging among unlike local area networks.

The present invention is uniquely suited to internetworking among a plurality of token ring LANs which perform the IBM Source Routing specification. Thus, each of the bridges, 105-1, 105-2, . . . 105-N, as shown in FIG. 2 include a source route filter hardware which operates independent of the ring out parameter in the source routed frame.

In operation, the adapter, such as 105-1, stores a port LAN identifier identifying the LAN to which the port is connected, and a bridge identifier uniquely identifying the bridge 100. An input frame is sampled to read the input LAN identifier and bridge identifier in a frame received by the input bridge port. The sampled input LAN identifier and bridge identifier are compared with the stored port LAN identifier and bridge identifier. The bridge port 105-1 forwards the received frame to the bridge host processor 101 if a match is found in the comparing step. The bridge host processor reads the output LAN identifier from the received frame. If the output LAN identifier identifies one of the plurality of output LANs coupled to the bridge, then it forwards the frame to a bridge port coupled to the identified output LAN.

The transfer from the port to the host processor 101 is carried out by forwarding the received frame from the port to a shared memory 103. The frame in the shared memory 103 is then processed by the host CPU 102 for determining the output LAN and retransmission to the identified LAN.

In one preferred system, the bridge host processor 101 will include software executed by the bridge host CPU for determining the output LAN identifier and whether the bridge is coupled to a matching output LAN. Also, the host processor 101 includes software for responding to explorer frames and the like.

FIG. 3 illustrates a bridge port for use in an N-way bridge according to the present invention. A bridge port includes a line interface 201 which is adapted for connection to a token ring network across line 202. The line interface 201 is coupled to a token ring processor 203 across line 204. The token ring processor in one preferred system consists of the TMS380C16 integrated circuit Token Ring COMMprocessor, available from Texas Instruments, Inc., or some other processor which supports source routing filters. See, *TMS380 Second-Generation Token Ring User's Guide*, 1990, Texas Instruments, Inc., pp. 1-5 to 1-18, 2-16 to 2-27, 3-35 to 3-37, and throughout.

The token ring processor 203 is coupled to a port memory 205 across line 206. The line 206 is also coupled to a source route hardware assist logic 207. Hardware assist logic 207 generates control signals across line 208 for supply to the token ring processor 203 in support of source route filtering. The token ring processor 203, memory 205, and source route hardware are coupled to the host backplane bus, such as bus 104 in FIG. 2, across line 209.

The token ring processor 203 performs media access control functions for the token ring coupled to the line interface 201. As a frame is received through the token ring processor 203, it is written to the memory 205. As it is written to the memory 205, the frame is sampled by the source route hardware assist logic, to read the ring in number, bridge number, and other parameters from the frame. If the source route hardware assist logic 207 determines a matching frame, then control signals are asserted across line 208 to the token ring processor. In the case of the TMS380C16, the control signals include the XMATCH and XFAIL signals. The token ring processor 203 determines, based on the control signals 208, whether to copy the source routed frame to the bridge host across line 209. The source route hardware assist logic 207 is also coupled to the host backplane across line 209 so that the host may write bridge parameters to the source route hardware assist logic for use in source route filtering.

FIG. 4 is a functional block diagram of the source route hardware assist logic 207. The source route hardware assist logic 207 receives as input real time data across bus 206, and parameters for storage from the host across bus 209, and generates as output control signals for supply to the token ring processor across bus 208. The logic includes a real time data store 220, which stores 16 bits of data from bus 206 as a frame is received by the port, and receive direction RC DIR bit store 221, which stores the direction bit of a received frame. The output on line 238 from the receive direction store 221 is coupled to the parse logic with ring out override 235.

The port bridge number and ring in and ring out parameters are loaded in stores 228, 229, and 230 from the host across bus 209 during initialization of the port. In addition, the host processor loads an N-way bit in register 231 during initialization to specify a first state indicating that the bridge is configured for two way bridging and a second state indicating that the bridge is configured for N-way bridging. The output on line 237 from the N-way store 231 is coupled to the parse logic with ring out override 235.

The routing information, including the ring in, bridge number, and ring out parameter, is distributed across two segment numbers of 16 bits each in an incoming frame. The received direction bit is latched in store 221 from the bus 206 when the high order bit of the source address field is set. In the following cycle, a bridge number and ring identifier from the first segment of the routing information field are latched in the real time data store 220. The bridge number in the top 4 bits is supplied on line 222 to a bridge number comparator 223. The lower 12 bits of the real time data latch 220 are supplied to a ring in comparator 224 across line 225 and a ring out comparator 226 across line 227. The output on line 232 from the bridge comparator 223, the output on line 233 of the ring in comparator 224 and the output on line 234 of the ring out comparator 226 are all coupled to parse logic with ring out override 235. The receive direction bit in store 221 is supplied to the parse logic with ring out override 235 to indicate in which order the ring in and ring out parameters arrive. The parse logic with the ring out override 235 is responsive to the receive direction bit in store 221 to parse the output of the comparators and generate a match signal on line 208 indicating to the token ring processor 203 that the frame should be copied to the bridge host processor. When the N-way bit is set in store 231, the output of the ring out comparator 226 is overridden so that the match signal is asserted independent of the ring out parameter in the received frame.

In one preferred embodiment, the ring out parameter store 230 and ring out comparator 226 are eliminated. However, the port in the preferred implementation is supplied on a modular plug-in card which may be optionally used to configure either a two way or an N-way bridge. Thus, the ring out capability is provided to support standard two way bridging using the bridge port card shown in FIG. 3. If the N-way bit is set in store 231, then the output of the ring out comparator 226 is overridden, making the source filtering independent of the ring out parameter.

The parse logic with ring out override, illustrated in FIG. 5, receives the bridge match signal on line 232, a ring in match signal on line 233, a ring out match signal on line 234, a receive direction signal on line 238, and the N-way signal on line 237. The output of the logic includes the XMATCH and XFAIL signals on line 208 for driving the TMS380C16 control signals of the same names. The logic is adapted for a first state performing standard two way bridging which performs a hardware ring out comparison. The N-way bit on line 237 is used to override the ring out comparison so that in a second state the ring out comparator always appears to be true to the logic for source routing in N-way bridge configurations. For systems in which no two way bridging is to be supported, the ring out match logic is eliminated.

As described above, the receive direction bit specifies the order in which the ring in and ring out parameters arrive in the frame. When the receive direction bit is low, the ring in parameter occurs first (forward state). When the receive direction bit is high, the ring out parameter occurs first (reverse state).

Thus, the output RI MATCH of the ring in comparator on line 233 is connected to a first AND gate 250. The AND gate 250 includes an active low input on the receive direction bit so that the ring in match signal on line 233 is generated as the RI FWD signal on line 252 when the receive direction bit is low.

The RI MATCH signal on line 233 is also coupled as one input to AND gate 251. The second input to AND gate 251 is the receive direction bit on line 238. Thus, when the receive direction bit on line 238 is high, the RI MATCH signal on line 233 is supplied as the RI REV signal on line 253.

When the N-way parameter on line 237 is high, then the output RO MATCH of the ring out comparator on line 234 is overridden by the OR gate configuration consisting of OR gates 254 and 255. Thus, OR gate 254 includes a first input coupled to the N-way signal on line 237 and a second input coupled to the RO MATCH signal on line 234. Similarly, OR gate 255 includes a first input coupled to the RO MATCH signal on line 234 and a second input coupled to the N-way signal on line 237.

The output of the OR gate 254 is coupled to NAND gate 256. The second input to NAND gate 256 is an active low terminal coupled to the receive direction bit on line 238. Thus, for N-way matching, when the receive direction bit is low, the NAND gate 256 drives an active low RO FWD signal on line 257 to the low state, indicating a ring out match, overriding the actual ring out match on line 234. When the N-way signal is low, the actual RO MATCH signal is passed through as RO FWD to line 257.

Similarly, the output of OR gate 255 is supplied as one input to AND gate 258. The second input to AND gate 258 is the receive direction signal on line 238. When the receive direction bit on line 238 is high, then the output of OR gate 255 is supplied as the RO REV signal on line 259. When the N-way bit is high, then RO MATCH is overridden. If the N-way bit is low, the RO MATCH is supplied as RO REV when the receive direction bit is high.

Thus, in the forward state, indicated by a low receive direction bit, the RI FWD signal on line 252 is generated, followed by, in the next cycle, the RO FWD (active low) signal on line 257. When the receive direction bit is high, then the RO REV signal is generated on line 259, followed by the RI REV signal on line 253.

The RI FWD signal and the RO REV signal are supplied as inputs to OR gate 260. The output of OR gate 260 is supplied to AND gate 261. The second input to AND gate 261 is a bridge match signal BR MATCH on line 232. Thus, if RI FWD or RO REV are high and BR MATCH is high, then the output of AND gate 251 is supplied to register 262 in a true state. Register 262 is clocked by a clock signal from timing/control logic 263. The timing/control logic also generates an enable signal and a reset signal for controlling register 262. Register 262 stores the result of the comparisons performed on the first segment number for supply on line 264.

Line 264 is coupled to NAND gate 265. A second input to NAND gate 265 is a state signal on line 266 generated by the timing/control logic 263. The signal on line 266 indicates to the logic that the second segment number is being sampled by the source filtering logic. The output of the NAND gate is supplied on line 267 (active low) as inputs to OR gates 268 and 269.

A second input to OR gate 268 at an active low terminal is the RI REV signal from line 253. The second input to OR gate 269 is the RO FWD signal (active low) from line 257. If the signal line 267 is low, then the output of OR gate 268 is low when the RI REV signal on line 253 is high, indicating a ring in match. When there is no ring in match, then the output of OR gate 268 will be high. Similarly, the output of OR gate 269 will be high unless both the signals on line 267 and the RO FWD signal on line 257 are asserted low, indicating a ring out match during the sampling of the second segment number in the frame.

The outputs of OR gates 268 and 269 are supplied to AND gate 270. The output of the AND gate 270 is an active low signal indicating a matching bridge number and ring in number for the N-way routing configuration, and for a two way routing configuration a matching ring in number, bridge number, and ring out number.

The signal at the output of AND gate 270 is supplied to XMATCH/XFAIL logic 271, which combines this match signal at the output of AND gate 270 with other logic such as error detection and the like which is used in the generation of the XMATCH and XFAIL signals on lines 208.

CONCLUSION

Accordingly, the present invention provides an N-way source routing system which allows a user to select N-way routing in the hardware for bridging local area networks, such as token rings, FDDI networks, or others. In the N-way mode, the hardware ignores the ring out parameter in the data frame. Each data frame having a matching ring in and bridge number is then copied to the host processor where software is used to forward the data to one of any number of ports attached to the bridge. This is all done without using the virtual ring which consumes a hop count as is done in prior art systems. It also allows full use of all pre-existing systems implementing the IBM source routing scheme.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A bridge for connecting a plurality of local area networks (LANs) through which source routed frames are transmitted including data identifying an input LAN, an output LAN and a bridge across which the frame is to be routed from the input LAN to the output LAN, comprising:
    a bridge host processor; and
    a plurality of bridge ports coupled to the bridge host processor and to respective LANs, wherein at least one bridge port in the plurality of bridge ports includes forwarding resources responsive to the input LAN and bridge identified by data in a source routed frame and independent of the output LAN identified by data in the source routed frame, which forward the source routed frame to the bridge host processor for retransmission to the output LAN if accessible through another of the plurality of bridge ports; wherein the at least one bridge port is adapted for connection to a token ring network LAN; wherein the source routed frames have a format including an input LAN identifier, a bridge identifier, an output LAN identifier, and an ordering parameter, the ordering parameter identifying an order within the source routed frame for the input.

2. The bridge of claim 1, wherein source routed frames have the format including the input LAN identifier, the bridge identifier and the output LAN identifier to specify a hop from one LAN across a bridge to another LAN, and the bridge host processor includes software for determining the output LAN identifier in a source routed frame forwarded from a bridge port, and for routing a source routed frame to a bridge port in the plurality of bridge ports coupled to the determined output LAN, if available.

3. The bridge of claim 1, wherein the bridge host processor includes software for determining the output LAN identified by data in a source routed frame forwarded from a bridge port, and for routing a source routed frame to a bridge port in the plurality of bridge ports coupled to the determined output LAN, if available.

4. A bridge for connecting a plurality of local area networks (LANs) through which source routed frames are transmitted, wherein source routed frames have a format including an input LAN identifier, a bridge identifier and an output LAN identifier to specify a hop from one LAN across a bridge to another LAN, comprising:
    a bridge host processor; and
    at least three bridge ports coupled to the bridge host processor and to respective LANs, wherein at least one bridge port coupled to the bridge host processor includes:
    resources that store a bridge identifier and a port LAN identifier for the bridge port;
    resources that sample the input LAN identifier and bridge identifier in received frames;
    logic associated with the resources that store and the resources that sample, having an output, that compares the stored bridge identifier and port LAN identifier with the sampled bridge identifier and input LAN identifier to apply a match signal to the output when a source routed frame identifies a matching bridge identifier and a matching input LAN identifier independent of the output LAN identifier; and
    a network interface processor to perform medium access processing for the bridge port, and responsive to the match signal to forward the source routed frame to the bridge host processor from which it may be retransmitted to the LAN identified by the output LAN identifier, if accessible through another of the bridge ports coupled to the bridge host processor; wherein the format further includes an ordering parameter identifying an order within the source routed frame for the input LAN identifier, bridge identifier and output LAN identifier, and the at least one bridge port further includes resources that sample.

5. The bridge of claim 4, wherein the bridge host processor includes software for reading the output LAN identifier in a source routed frame forwarded from a bridge port, and for routing a source routed frame to a bridge port coupled to the output LAN identified by the read output LAN identifier, if available.

6. The bridge of claim 4, wherein the at least one bridge port is adapted for connection to a token ring network LAN.

7. A bridge port for connecting a local area network (LAN) through which source routed frames are transmitted to a bridge having a bridge host processor, wherein source routed frames have a format including an input LAN identifier, a bridge identifier and an output LAN identifier to specify a hop from one LAN across a bridge to another LAN, comprising:

resources that store a bridge identifier and a port LAN identifier for the bridge port;

resources that sample the input LAN identifier and bridge identifier in received frames;

circuitry, connected to the resources that store and the resources that sample and having an output, that compares the stored bridge identifier and port LAN identifier with the sampled bridge identifier and input LAN identifier to apply a match signal to the output when a source routed frame identifies a matching bridge identifier and a matching input LAN identifier independent of the output LAN identifier; and a network interface processor to perform medium access processing for the bridge port, and responsive to the match signal to forward the source routed frame to the bridge host processor from which it may be retransmitted to the LAN identified by the output LAN identifier, if accessible through another of the bridge ports coupled to the bridge host processor; wherein the format further includes an ordering parameter identifying an order within the source routed frame for the input LAN identifier, bridge identifier and output LAN identifier, and further including:

resources that sample the ordering parameter in a received frame; and resources which locate the input LAN identifier in the received frame in response to the ordering parameter. received frame in response to the ordering parameter.

8. The bridge port of claim 7, further including:

resources that store an output LAN identifier;

resources that sample the output LAN identifier in a received frame;

compare logic which compares the sampled output LAN identifier and stored output LAN identifier to assert an output LAN match signal indicating a match or no match;

wherein the network interface processor is further responsive to the output LAN match signal in forwarding the received frame to the bridge host processor;

resources that store an output LAN match override parameter having a first state indicating no output LAN match and a second state indicating output LAN match;

overriding logic that responds to the first state of the output LAN override match parameter, by overriding the compare logic to cause the output LAN match signal to indicate always a match.

9. The bridge of claim 7, wherein the network interface processor performs medium access processing a token ring network LAN.

* * * * *